Patented Mar. 10, 1931

1,796,011

UNITED STATES PATENT OFFICE

WILHELM ECKERT, OF FRANKFORT-ON-THE-MAIN-HOCHST, GERMANY, ASSIGNOR TO GENERAL ANILINE WORKS, INC., OF NEW YORK, N. Y., A CORPORATION OF DELAWARE

ACID WOOL DYESTUFFS AND PROCESS OF PREPARING THEM

No Drawing. Application filed October 20, 1928, Serial No. 313,954, and in Germany October 29, 1927.

My present invention relates to new dyestuffs and to a process of preparing them.

I have found that new dyestuffs yielding extremely clear shades are obtained by causing a compound of the general formula:

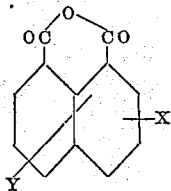

wherein X represents the sulfonic or the sulfaminic acid group and Y represents a monovalent substituent or hydrogen and another compound of the group consisting of $NH_3$, alkyl—$NH_2$, aralkyl—$NH_2$, aryl—$NH_2$, and aryl$\langle^{NH_2}_{NH_2}$ (ortho), (the aryl residues being substituted or not) to act upon each other in the presence of water at a temperature of about 100° C. The reaction may be effected either by a simple heating operation or by heating in an autoclave under pressure.

The same or similar dyestuffs are obtained by transforming the reaction products of naphthalic anhydride, or a derivative thereof, with ammonia, an aliphatic or aromatic amine into the sulfonic acids or sulfamic acids respectively, or by subjecting naphthalic anhydride or a derivative thereof to reaction with a sulfonic acid of an amine.

The new dyestuffs, to which the following formula may be attributed

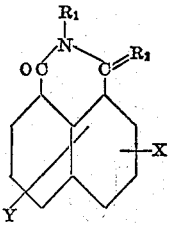

wherein X represents the sulfonic or the sulfaminic acid group, Y represents a monovalent substituent or hydrogen, $R_1$ stands for hydrogen, alkyl, aralkyl or aryl (the aryl residue being substituted or not), in which case $R_2$ is oxygen, or $R_1$ and $R_2$ jointly represent the group

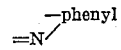

(the phenyl nucleus being substituted or not) dye the animal fiber from an acid bath very even tints. They are furthermore partly suited for dyeing cellulose esters and cellulose ethers intense bright shades of an extreme purity.

The following examples serve to illustrate my invention, but they are not intended to limit it thereto, the parts being by weight.

1. 50 parts of 4-sodium-sulfamin-1.8-naphthalenedicarboxylic anhydride of the following formula:

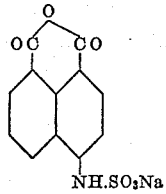

are heated to boiling in 800 parts of water with 30 parts of ortho-phenyldiamine. When the reaction is finished, the undissolved part of the product is filtered off by suction and the dyestuff is salted out in the usual manner; it has probably the following formula:

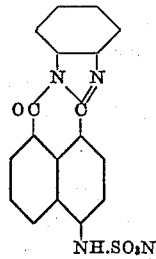

and forms an orange colored powder, dyeing wool from an acid bath orange yellow tints.

2. When, instead of ortho-phenylenediamine the corresponding quantity of aniline is used, a dyestuff of the following formula:

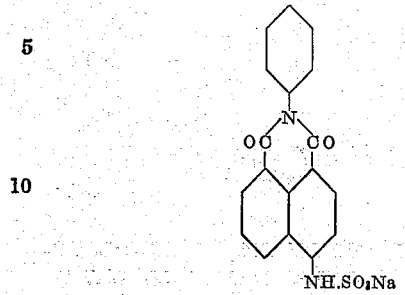

is obtained, dyeing wool from an acid bath a bright clear yellow tint, which is superior as regards its greenish hue to the known quinoline yellow colors. Artificial silk made of cellulose esters or cellulose ethers is dyed clear greenish-yellow tints of a great intensity and a bright greenish fluorescence.

3. 50 parts of 4-sodium sulfamin-1.8-naphthalenedicarboxylic anhydride and 200 parts of ammonia are heated in an autoclave to 100° C. After having worked up the product as indicated in Example 1, a dyestuff is obtained having the following formula:

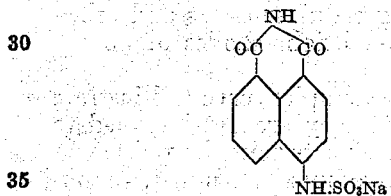

which dyes wool and acetate silk from an acid bath a very clear yellow tint.

4. 10 parts of the sulfonic acid of 4-amino-1.8-naphthalenedicarboxylic anhydride, obtained by sulfonation of 4-amino-1.8-naphthalic anhydride, are heated to boiling with 10 parts of ortho-phenylenediamine and 200 parts of water. When the reaction is complete, the mass is filtered by suction and the resulting dyestuff is salted out; it has probably the following formula:

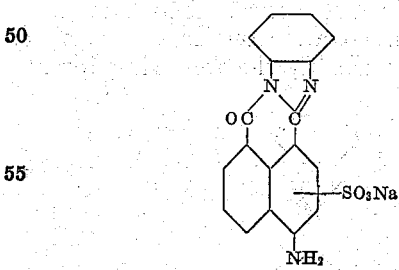

and dyes wool an orange tint. The product obtained by the reaction of the acid mentioned in Example 4, with ammonia shows a clear yellow color.

5. 10 parts of 4-amino-1.8-naphthalimide, obtained by treatment of 4-aminonaphthalic anhydride with ammonia, are heated with 100 parts of sulfuric acid monohydrate to a temperature of about 110° C., till a test sample taken from the mass has become water-soluble. As soon as this is the case, the mass is poured into water and the dyestuff is salted out in the usual manner. It has the following formula:

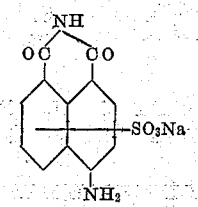

and dyes wool from an acid bath a clear yellow tint.

6. 21.2 parts of 4-aminonaphthalimide are introduced, while stirring, into a mixture, prepared with cooling, of 40 parts of chlorosulfonic acid and 400 parts of pyridine and the whole is heated for 3 hours to 50–60° C. On addition of 60 parts of sodium carbonate, the pyridine is distilled off by means of water vapor. The residual solution is then filtered cold with diluted acetic acid, whereby the unaltered 4-aminonaphthalimide is separated. The filtrate is then neutralized and salted out. The sulfamic acid thus obtained has the formula:

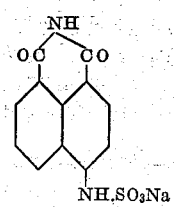

and dyes wool from a bath acidified with acetic acid clear yellow tints. The dyestuff is furthermore suited for dyeing cellulose esters and cellulose ethers clear yellow shades of an intense greenish fluorescence.

7. 14.4 parts of 4-aminonaphthalphenylimide are introduced into a mixture of 15 parts of chlorosulfonic acid and 200 parts of pyridine and the whole is heated for 3 hours to 50–60° C. The mass is then subjected together with 30 parts of sodium carbonate to distillation with water vapor. The unaltered portion of 4-aminonaphthalphenylimide is then filtered off and salted out. The resulting product has the following formula:

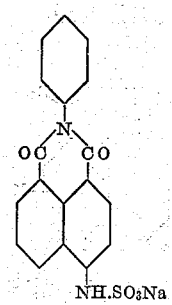

and dyes wool from a bath acidified with acetic acid bright yellow tints. Acetate silk treated in a dye bath which contains a quantity of about 2.5% of the dyestuff, calculated upon the weight of the acetate silk, is dyed a clear greenish-yellow tint of a great intensity and an excellent greenish fluorescence.

By using instead of the 4-aminonaphthalphenylimide as per Example 7, 4-aminonaphthalethylimide or 3-aminonaphthalmethylimide and proceeding as indicated in Example 7, dyestuffs of similar properties are obtained.

8. 10 parts of 4-aminonaphthalic anhydride are heated to boiling with 10 parts of sodium 4-toluidine-3-sulfonate and 200 parts of water on the reflux condenser until the formation of the dyestuff is finished; it is then filtered by suction and the dye is obtained from the aqueous solution in the usual manner, for instance by salting it out. It has the following formula:

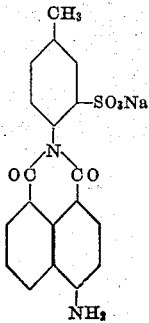

and dyes the animal fiber from an acid bath a very clear yellow tint.

9. 10 parts of 4-amino-sulfo-1.8-naphthalenedicarboxylic anhydride, obtained by sulfonation of 4-amino-1.8-naphthalic anhydride with sulfonating agents, are heated to boiling with 10 parts of para-toluidine and 100 parts of water for 3–4 hours. The excess of para-toluidine is then blown off by means of water vapor. After filtration of the solution, the dyestuff separates therefrom on cooling in the form of golden-yellow lamellæ. By salting out the filtrate, a further quantity of the dyestuff can be obtained. This dyestuff has the following formula:

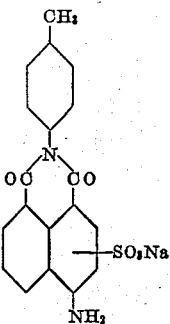

and is a yellow crystalline powder, which dissolves in water with a clear yellow tint, with a strong greenish fluorescence. It dyes the animal fiber from an acid bath a greenish yellow tint, which is superior as regards its greenish hue to the known quinoline yellow dyes possessing at the same time a clearness which has never before been attained.

I claim:

1. The process which comprises causing a compound of the group consisting of

NH₃, alkyl—NH₂, aralkyl—NH₂, aryl—NH₂ and aryl$\langle^{NH_2}_{NH_2}$ (ortho), (the aryl residues being substituted or not) to act upon a compound of the general formula:

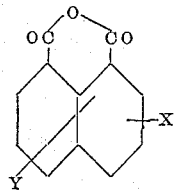

wherein X represents the sulfonic or the sulfaminic acid group and Y represents a monovalent substituent or hydrogen in the presence of water at a temperature of about 100° C.

2. The process which comprises causing a compound of the group consisting of

NH₃, alkyl—NH₂, aralkyl—NH₂, aryl—NH₂ and aryl$\langle^{NH_2}_{NH_2}$ (ortho), (the aryl residues being substituted or not) to act upon a compound of the general formula:

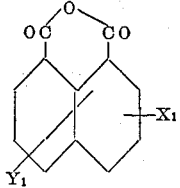

wherein $X_1$ represents the sulfonic acid group and $Y_1$ represents the amino group, or $X_1$ represents the sulfaminic acid group and $Y_1$ stands for hydrogen in the presence of water at a temperature of about 100° C.

3. The process which comprises causing a compound of the group consisting of

NH₃, phenyl—NH₂ and phenyl$\langle^{NH_2}_{NH_2}$ (ortho), (the phenyl residues being substituted or not) to act upon a compound of the formula:

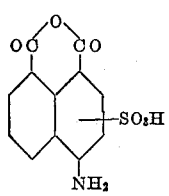

in the presence of water at a temperature of about 100° C.

4. The process which comprises causing para-toluidine to act upon a compound of the formula:

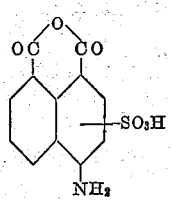

in the presence of water at a temperature of about 100° C.

5. As new products the water soluble dyestuffs of the following general formula:

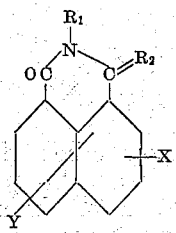

wherein X represents the sulfonic or the sulfaminic acid group, Y represents a monovalent substituent or hydrogen, $R_1$ stands for hydrogen, alkyl, aralkyl or aryl, (the aryl residue being substituted or not) in which case $R_2$ is oxygen, or $R_1$ and $R_2$ jointly represent the group

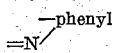

(the phenyl nucleus being substituted or not) said dyestuffs giving on animal fiber very even and extremely clear tints.

6. As new products the water soluble dyestuffs of the following general formula:

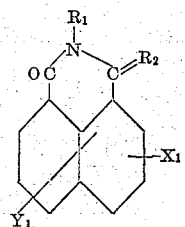

wherein $X_1$ represents the sulfonic acid group and $Y_1$ represents the amino group, or $X_1$ represents the sulfaminic acid group and $Y_1$ stands for hydrogen, $R_1$ stands for hydrogen, alkyl, aralkyl, or aryl, (the aryl residue being substituted or not) in which case $R_2$ is oxygen, or $R_1$ and $R_2$ jointly represent the group

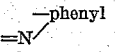

(the phenyl nucleus being substituted or not) said dyestuffs giving on animal fiber very even and extremely clear tints.

7. As new products, water soluble dyestuffs of the following general formula:

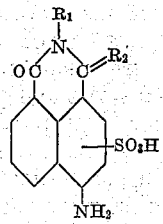

wherein $R_1$ stands for hydrogen or phenyl, (the phenyl residue being substituted or not) in which case $R_2$ is oxygen or $R_1$ and $R_2$ jointly represent the group

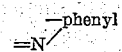

(the phenyl residue being substituted or not) giving on animal fiber from an acid bath very even and extremely clear tints.

8. As a new product, the water-soluble dyestuff of the following formula:

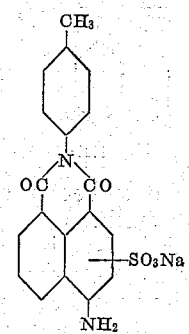

being a yellow crystalline powder dissolving in water to a clear yellow solution with a strong greenish fluorescence, dyeing the animal fiber from an acid bath a greenish yellow tint.

9. As new products the water soluble dyestuffs of the following general formula:

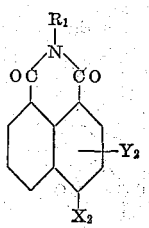

wherein $R_1$ represents hydrogen, alkyl, aralkyl or aryl, $X_2$ represents the amino group in which case $Y_2$ stands for a sulfonic acid group or $X_2$ represents a sulfaminic acid group in which case $Y_2$ stands for hydrogen, said dyestuffs giving on animal fiber very even and extremely clear tints.

10. As new products the water soluble dyestuffs of the following general formula:

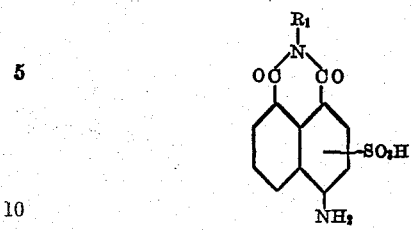

wherein $R_1$ represents hydrogen, alkyl, aralkyl or aryl, said dyestuffs giving on animal fiber from an acid bath very even and extremely clear tints.

11. As new products the water soluble dyestuffs of the following general formula:

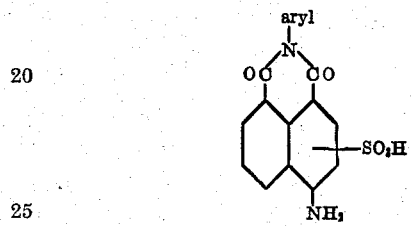

said dyestuffs giving on animal fiber from an acid bath very even and extremely clear tints.

12. As a new product the water soluble dyestuffs of the following general formula:

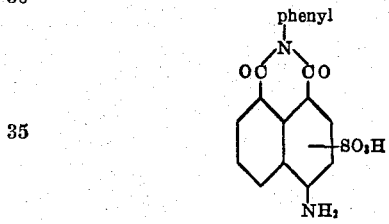

said dyestuffs giving on animal fiber from an acid bath very even and extremely clear tints.

In testimony whereof, I affix my signature.

WILHELM ECKERT.